United States Patent Office 3,551,063
Patented Dec. 29, 1970

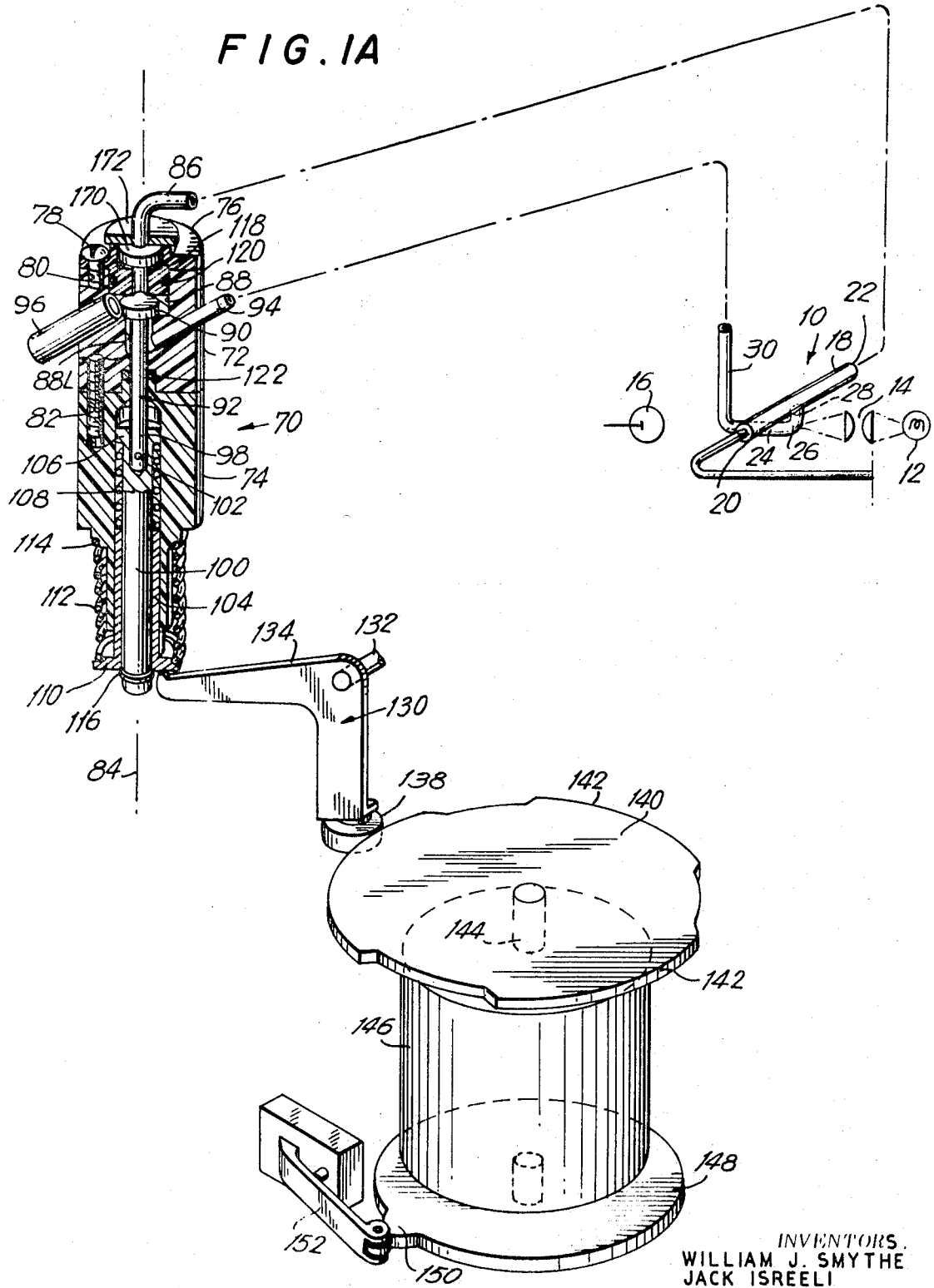

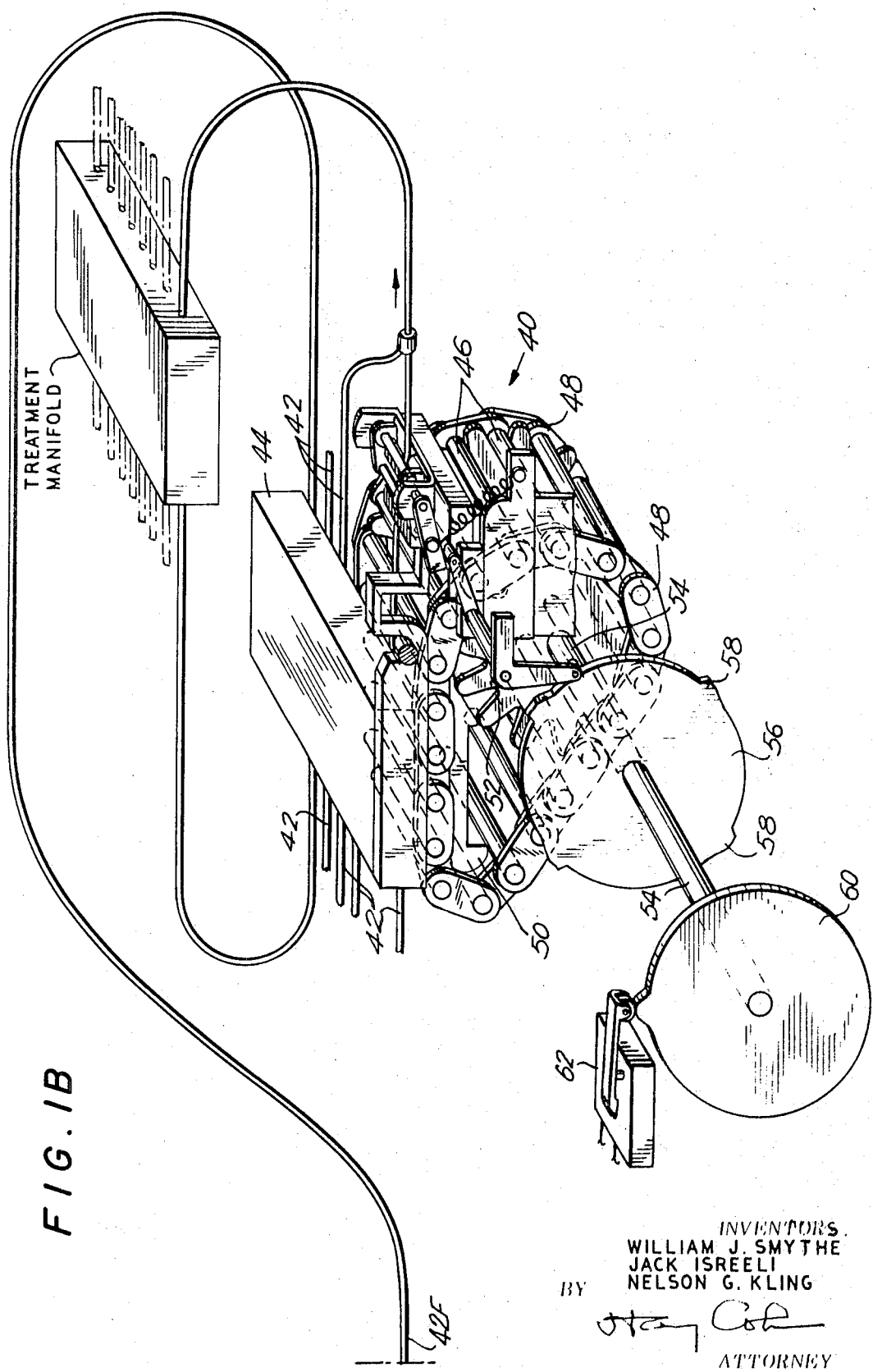

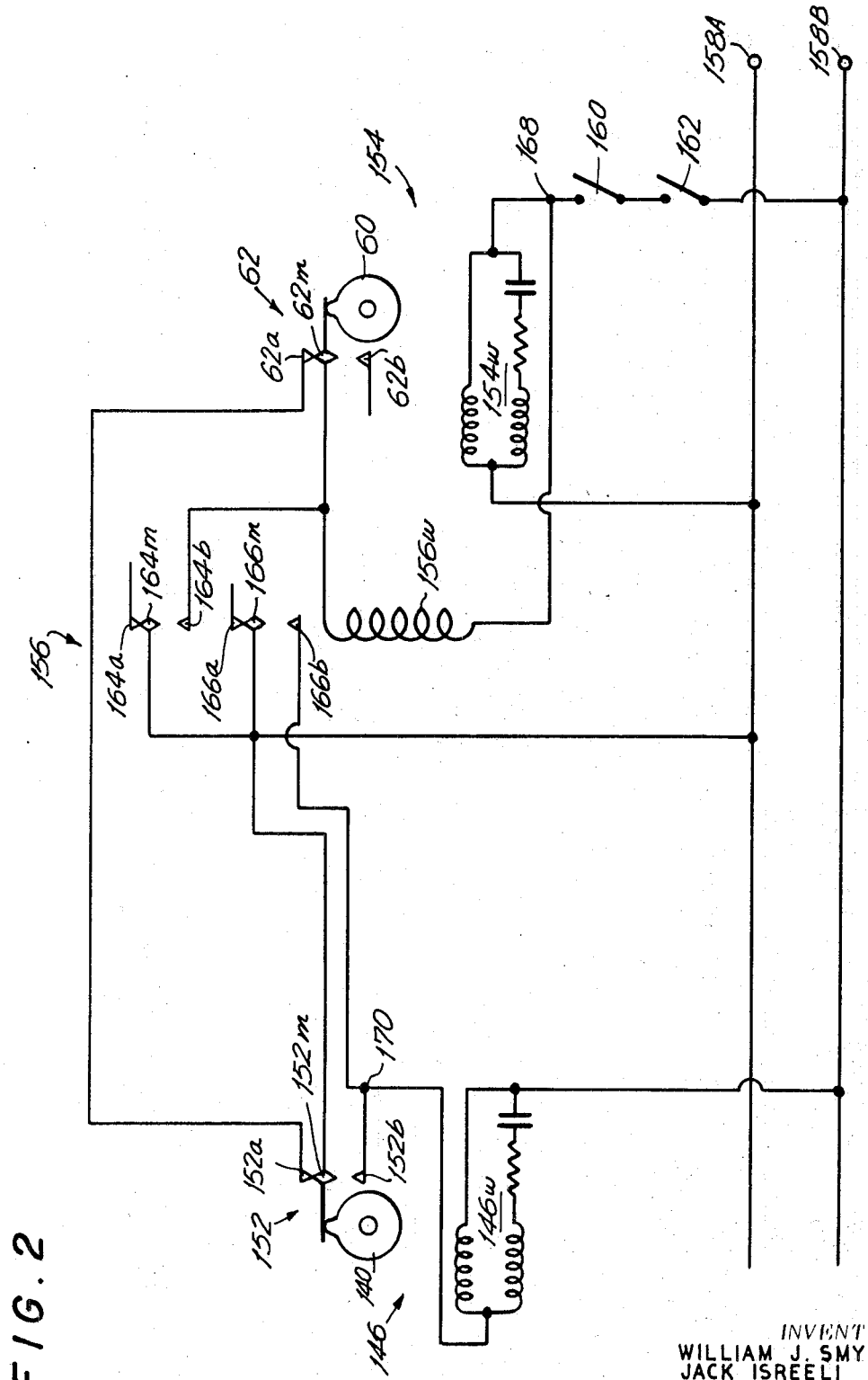

3,551,063
DEBUBBLING MEANS AND METHOD FOR LIQUID ANALYSIS APPARATUS
William J. Smythe, Rye, and Jack Isreeli, Mamaroneck, N.Y., and Nelson G. Kling, Ringwood, N.J., assignors to Technicon Corporation, Ardsley, N.Y., a corporation of New York
Filed Sept. 13, 1967, Ser. No. 667,394
Int. Cl. G01n 1/14, 21/00
U.S. Cl. 356—246     7 Claims

ABSTRACT OF THE DISCLOSURE

A colorimeter has a flow cell with a single inlet for receiving a gas segmented stream of liquid to be analyzed, a first outlet for passing a quotient of said stream including all of the gas segments, and a second outlet, including the sight passageway, for passing the remaining quotient of said stream. A three way valve is provided for alternatively, cyclically closing each of these outlets. The gas segments are uniformly spaced apart in the stream, and the valve time cycle is made equal to the interval between successive gas segments. The ratio of time intervals that each of the outlets is open is substantially equal to the ratio of gas to sample volumes.

BACKGROUND OF THE INVENTION (1) Field of the invention

This invention relates to the field of colorimetry, and particularly to the colorimetric analysis of a gas segmentized flowing stream of sample liquid.

(2) Description of the prior art

In systems of this nature, a flowing stream of a sample liquid, which stream may be a continuous monitoring stream, or may be a flowing stream of sequential liquid samples, is continuously mixed, in a predetermined proportion with one or more reagents, and/or otherwise processed to provide a color reaction, the optical density of which is responsive to the concentration of a substance in the original sample. Such a system was disclosed in U.S. Pat. No. 2,797,149, granted to L. T. Skeggs on June 25, 1957. Customarily, the continuous stream of sample plus reagent is divided into sequential segments, each succeeding sample segment being spaced from its preceding segment by a gas segment. The gas segments serve to compartmentalize volumes of sample plus reagent for uniform mixing. To obtain uniform proportions of sample to reagent, it has been found advantageous to use a proportioning pump such as is disclosed in U.S. Pat. No. 3,306,229, granted to W. J. Smythe on Feb. 26, 1967. Customarily, the gas segments are removed from the flowing stream before they are passed through the sight passageway of the flow cell of the colorimeter. This is discussed in U.S. Pat. No. 3,109,714, granted to L. T. Skeggs on Nov. 5, 1963. The present trend in these analytical systems is to use smaller and smaller sample volumetric flow rates, and, therefore, smaller and smaller contained volumes in the flow cells, with maximum length of sight passageway in the flow cells, such as is shown in U.S. Pat. No. 3,236,602, granted to J. Isreeli on Feb. 22, 1966. It has been found desirable to retain the gas segments in the sample stream as far along its length towards the sight passageway as is possible, so as to provide the cleansing action of these gas segments on the inner walls of the conduits for as long a length as is possible.

In the flow cell shown in U.S. patent application Ser. No. 556,740, filed by L. T. Skeggs on June 10, 1966, the gas segments are diverted from the sample stream to be examined at substantially the entrance to the sight passageway of the flow cell. Briefly, this flow cell includes a first, substantially horizontal conduit having an inlet and an outlet. The gas segmentized stream is pumped into this inlet at a first predetermined volumetric rate. A second, substantially horizontal conduit, serving as a sight passageway and having an inlet and an outlet, is disposed immediately below the first conduit with this inlet of the second conduit, being extended to form an intermediate outlet in the lower portion of the first conduit. A pump tube is coupled to the outlet of the second conduit and withdraws liquid therefrom at a second predetermined volumetric rate. The second rate is proportionally smaller, with respect to the first rate, than the volume of sample liquid to the volume of sample liquid plus gas segmentizing fluid. Thus, a quotient stream consisting entirely of relatively dense sample liquid is drawn through the intermediate outlet of the first conduit and through the sight passageway provided by the second conduit therebelow, while the relatively less dense gas, and the remainder of the sample liquid remain in the first conduit alone, and pass out to waste.

It will be appreciated that this mentioned flow cell requires in addition to the pump tubes for pushing sample and reagents toward the flow cell, a pump tube to pull through the sight passageway the sample liquid to be examined. When an analytical system, such as is shown in U.S. Pat. No. 3,241,432, granted to L. T. Skeggs et al. on Mar. 22, 1966, divides each sample into a plurality of quotients, each for analysis for a different constituent in a respective manifold and flow cell, this requirement of an additional, pulling, pump tube per flow cell becomes significant with respect to the number of pumps required for the system.

SUMMARY OF THE INVENTION

It is an object of this invention to provide a system for reducing the number of pump tubes required to operate a flow cell of a colorimeter wherein the gas segments are removed from a gas segmented sample liquid stream before the sample liquid is examined in the sight passageway of the flow cell. The principle of this invention resides in the provision of a three way valve means coupled to the downstream end of a flow cell system. The flow cell system has an inlet into which a gas segmentized sample liquid stream is pumped at a predetermined volumetric rate. A first inlet of the valve means is coupled to the outlet of the sight passageway of the flow cell system, through which is to be passed only sample liquid. A second inlet of the valve means is coupled to the outlet of the supply conduit of the flow cell system, through which is to be passed all gas segments and any remainder of sample liquid. The sight passageway has an inlet which is disposed below, and is fed by, an intermediate outlet in the lower portion of the supply conduit. The valve means cyclically and alternatively opens its first and second inlets. The first inlet to the sight passageway is open with respect to being closed for a ratio of time intervals which is equal to or less than the ratio of volume of sample liquid to volume of gas. Thereby, all of the relatively less dense gas remains in the supply conduit and all or most of the relatively more dense sample liquid falls into and through the sight passageway.

The invention may be used to advantage in both clinical analytical systems, and in industrial systems, wherever a gas segmentized liquid stream is to be colorimetrically analyzed.

BRIEF DESCRIPTION OF THE DRAWING

These and other objects, features and advantages of the invention will be apparent from the following specifications thereof, taken in conjunction with the accompanying drawing in which:

FIGS. 1A and 1B, taken in conjunction, are a diagrammatic view, in perspective, showing an embodiment of this invention including a flow cell, pump and valve; and FIG. 2 is a schematic diagram of an electrical circuit for synchronizing the operation of the pump and the valve of FIG. 1.

DESCRIPTION OF THE PREFERRED EMBODIMENT OF THE INVENTION

As seen in FIG. 1, the colorimeter includes a flow cell 10, a light source 12, a light focusing means 14, here shown as a pair of plano-convex lenses, and a light detector 16, here shown as a phototube.

The flow cell 10 is similar to the flow cell shown in U.S. patent application Ser. No. 556,749, supra, made of glass tubing. The cell includes an upper, substantially horizontal conduit 18, having an inlet end 20 and an outlet end 22; and a substantially horizontal conduit 24 having an inlet end 26 which is extended upwardly as an elbow to merge with an aperture 28 formed in the lower part of the upper conduit 18, and an outlet end 30 which is extended upwardly as an elbow to a length above the upper conduit. The lower conduit may be made of a smaller internal diameter than the upper conduit.

A pump 40 is substantially as shown in U.S. patent application Ser. No. 662,795 filed by T. Bilichniansky on Aug. 23, 1967, which is an improvement on U.S. Pat. No. 3,306,229, supra. Briefly, the pump includes a plurality of pump tubes 42 which extend in side by side relation between a platen 44 and a plurality of rollers 46. The rollers 46 are supported by and between two spaced apart endless roller chains 48, which pass over two spaced apart guide plates 50, and which are driven, respectively, by two sprocket wheels 52 fixed to a shaft 54. Each of the rollers, successively, engages and compresses the pump tubes against the platen, progressively occludes the tubes along a length thereof, and releases the tubes. Certain of the pump tubes may be used to pump sample liquid and a reagent to be mixed together in a conduit to provide a color reaction. Another pump tube may be used to periodically add a segment of inert gas, such as air, to the conduit to compartmentalize uniform volumes of sample and reagent. The periodic delivering of a gas segment is provided by a normally closed pinch clamp which is released periodically in a cycle whose interval is a multiple of the interval between successive rollers releasing the pump tubes. This is accomplished by a cam 56, here shown as having four rises 58, each for actuating a linkage coupled to the pinch valve, which is fixed to the sprocket wheel shaft 54. An additional, single rise cam 60, is also fixed to the shaft 54, to actuate a snap action switch 62, which will be described hereinafter with respect to FIG. 2. The pump tubes may be coupled to other components to form a sample treatment manifold, which will differ in its details depending on the particular constituent for which the sample is to be analyzed. Various manifolds are illustrated in U.S. Pat. No. 3,241,432, supra. In due course, the treated, gas segmentized, sample stream is passed through a pump tube 42F and is pumped, at a predetermined volumetric rate of flow, into the inlet end 20 of the upper conduit 18 of the flow cell.

A three way valve means 70 is coupled to the flow cell 10 and is operated in synchronism with the pump 40. The valve means includes an upper body portion 72, a lower body portion 74, and a cover 76, which are held together by a plurality of machine screws 78 passing through bores 80 in the upper body portion and into threaded bores 82 in the lower body portion. The body portions have a common longitudinal axis 84 through a variously diametered central bore. The cover has a conduit 86 sealed therethrough, which is coupled to the outlet 22 of the flow cell. The upper end of the bore has a T-shaped (in longitudinal cross-section) enlargement 88 in which the head 90 of a valve stem 92 operates. The head 90 of the stem is adapted to close either the leg 88L of the enlargement 88 or the lower end of the conduit 86. A conduit 94 is sealed through the upper body portion into the enlarged leg 88L of the enlargement 88. A conduit 96 is sealed through the upper body portion into the upper portion of the T-shaped enlargement. The lower end of the leg 98 of the valve stem is fixed into the upper end of a push rod 100 by a roll pin 102. The lower portion of the push rod is disposed in a sleeve 104. The upper end of the push rod has an annular flange 106. A helical compression spring 108 is disposed about the upper portion of the push rod, and is captured between the flange 106 and the upper end of the sleeve 104. The lower end of the sleeve 104 has an annular flange 110. A helical compression spring 112 is disposed about the lowermost part of lower body portion 74, and is captured between the flange 110 and a shoulder 114 formed on the lower body portion. The lower end of the push rod 100 extends beyond the lower end of sleeve 104, and is captured thereto by a C-clip 116 disposed in a groove in the rod. A plurality of O-rings 118, 120, 122 seal the junctions of the several parts.

A bell crank 130 is pivotally mounted at 132 to the base structure, and has one arm 134 which abuts the undersurface of the lower end of the sleeve 104, but not the undersurface of the end of the push rod 100. The other arm 136 of the crank 130 carries a cam follower roller 138 which rides on the periphery of a cam 140, having three rises 142. The cam 140 is fixed to the shaft 144 of a synchronous electric motor 146. A cam 148 is also fixed to the shaft 144, and has a single rise 150 adapted to actuate a snap action switch 152.

When the roller 130 rides on the dwell of the periphery of the cam 140 as shown in FIG. 1, the spring 112 biases the sleeves 110 downwardly against the arm 134. The sleeve 110 bears against the C-clip 116 to draw the push rod 100 downwardly, which biases the head 90 of the poppet valve stem 92 downwardly to close the leg 88L of the T-shaped enlargement of the valve bore. In this disposition of the poppet valve stem, the conduit 94, which is coupled to the outlet of the sight passageway of the flow cell, is closed; and the conduit 86, which is coupled to the outlets of the supply conduit of the flow cell, is coupled to the conduit 96. When the roller 138 rides on a rise 142 of the cam 140, the crank ram 134 pushes the sleeve 110 upwardly against the bias of the spring 112. The sleeve 110 pushes the inner spring 108 upwardly against the flange 106 to bias the push rod and the poppet valve stem upwardly to bias the head 90 of the poppet valve stem 92 upwardly against the outlet of the conduit 86. In this disposition of the poppet valve stem the conduit 86 is closed, and the conduit 94 is coupled to the conduit 96. The throw of the arm 134 is arranged to partly compress the inner spring 108 to firmly seat the poppet valve stem upwardly.

The cam 140 controlling the operation of the three way valve means is operated in synchronism with the cam 56 controlling the insertion of gas segments into treatment manifold. This rises 142 on the cam 140 as arranged to cycle the valve means 70 once, for each gas segment, and to have the ratio of the time interval that the conduit 80 is open to the time interval that the conduit 94 is open be equal or slightly greater than the ratio of the volume of the gas segment to the volume of the sample liquid segment. Thus, the sight passageway of the flow cell will be open to the flow of liquid, in each cycle of operation, for a fraction equal to or slightly less than the ratio the sample liquid volume has to the sample liquid plus gas segment volume passing into the flow cell. For example, if the gas segment has a volume which is ⅓ the volume of the sample liquid segment, the conduit 86 will be open for ¼ cycle or slightly more, and the conduit 94 will be open for ¾ cycle or slightly less. Thus, the gas segments will remain in the upper conduit and pass through it into the conduit 86 during the interval conduit 86 is open, and the sample liquid segments will fall into the sight passageway and pass thereout into the conduit 94 during the interval conduit 94 is open.

One of the principles providing accuracy in sequential analysis is uniformity and regularity in treatment. Each sample liquid segment must be formed and processed identically. For this reason the pump has been controlled to insert a constant volume of gas into the sample treating manifold at regular intervals in phase with the movement of the rollers. Similarly, it has been found advantageous to have the three way valve means operate regularly, and in phase with the insertion of gas by the pump. Inter alia, the interaction between any surge in the manifold produced by the gas segment introduction and the disposition of the three way valve means will be consistent.

Such synchronization is provided by the control circuit shown in FIG. 2. The pump 40 is driven by a synchronous motor 154 having a shaft to which is coupled the single lobe cam 60 for actuating the snap action switch 62. The three way valve means 70 is driven by the synchronous motor 146 having a shaft to which is coupled the single lobe cam 140 for actuating the snap action switch 152. The switches are interconnected through a control relay 156. The motors and the relay are energized from the power lines 158A and 158B. The windings and phase shifting network 154W are connected across the power lines through a manually operated main switch 160, and a switch 162 which is closed when the platen of the pump is down against the pump tubes. The snap action switch 62 has a movable contact 62m, an upper contact 62a and a lower contact 62b. The snap action switch 152 has a movable contact 152m, an upper contact 152a and a lower contact 152b. The relay 156 has a winding 156w, an upper contact stack having a movable contact 164m, an upper contact 164a and a lower contact 164b, and a lower contact stack having a movable contact 166m, and upper contact 166a and a lower contact 166b. The relay winding 156w is connected across the movable contact 62m and a junction 168. The contact 62a is connected to the contact 152a. The contacts 164m, 166m and 152m are connected to the power line 158A. The contacts 166b and 152b are connected to a junction 170, and the windings and phase shifting network 146w are connected across the junction 170 and the power line 158B. The contact 164b is connected to the contact 62m.

In operation, assume that the cams 140 and 60 are out of phase, and neither has shifted its contacts. The relay 156 is unenergized. The valve motor windings 146w will be initially energized via power line 158B, the normally closed contacts 152m and 152b to power line 158A. The cam 140 will be rotated until the lobe shifts the contact 152m from contact 152b to contact 152a deenergizing the windings and halting the cam in the lobe up position. When the switches 162 and 160 are closed the pump motor windings 154w will be energized. The cam 60 will be rotated until the lobe shifts the contact 62m to the contact 62a. The relay winding 156w will be energized from power line 158B, junction 168, contacts 62m and 62a, contacts 152m and 152a, and power line 158A. The contact 164 will be shifted to contact 164b establishing a latching circuit for the winding. The contact 166m will be shifted to the contact 166b, reenergizing the windings 146w, and both motors will now be rotating from an initial lobes up, in phase relation.

In a commercial application, wherein the pump has an interval of two seconds between successive rollers, and the insertion of gas segments, and wherein the volume of gas segment to the volume of liquid segment is 1 to 3, it has been found convenient to arrange the cams so that the insertion of the gas segment occurs during the middle of the interval that the three-way valve means has the conduit 94 open for the flow of liquid through the slight passageway. This is done, because the conduit 94 is open for an interval three times as long as the other conduit 86, and, therefore, permits a greater tolerance in phasing.

The conduit 86 may be made of glass and is adhered to a disk 170 which may be made of stainless steel and which is captured in the cover 76 by a plate 172. The plate 172 may be held to the valve body by any suitable means, as by a clamping bracket, not shown. The valve body and cover, 72, 74 and 76 may be made of a relatively hard fluorinated hydrocarbon plastic, such as "el-F," sold by Minnesota Mining and Manufacturing Company, and the valve stem 92 may be made of a relatively softer fluorinated hydrocarbon plastic, such as "Teflon," sold by E. I. du Pont de Nemours Co., Inc. The rod 100 and the sleeve 104 may be made of stainless steel.

While a preferred embodiment of the invention has been shown and described, it will be understood that the invention may be embodied otherwise than as herein specifically illustrated or described, and that certain changes in the form and arrangement of parts and in the specific manner of practicing the invention may be made without departing from the underlying principles of this invention within the scope of the appended claims.

What is claimed is:

1. A colorimeter including a flow cell and having an inlet and two outlets; and having an inlet and two outlets;
   means coupled to said inlet for transmitting a flowing stream of liquid samples regularly spaced apart by gas segments into said inlet, the volume of said liquid samples being uniform and having a predetermined first ratio to said volume of said gas segments;
   said flow cell including means coupled between said inlet and said two outlets for dividing said flowing stream into two quotient streams, the sight passageway of said flow cell being defined between said dividing means and one of said outlets;
   means for alternately closing said one outlet and said other outlet for causing said one quotient stream containing substantially only liquid to pass through said sight passageway and said one outlet and said other quotient stream containing substantially only gas to pass through said other outlet, said closing means being operative, during each cycle of operation, to open said one outlet for an interval of time having a predetermined second ratio to the interval of time that it opens said other outlet, said second ratio being equal to one slightly less than the first ratio, and
   means for passing a light beam through, at least, a portion of said one quotient stream passing through said sight passageway;
   whereby only one of the two available flow paths through the flow cell is open at any one time.

2. A colorimeter according to claim 1 wherein said closing means includes a three way valve having one inlet coupled to said one outlet of said flow cell and another inlet coupled to said other outlet of said flow cell, and actuating means for said valve, said actuating means being coupled to said transmitting means and synchronized with the gas segment transmission thereof.

3. A colorimeter according to claim 2, wherein the cycle of said valve is equal in time interval to the time interval between successive gas segments.

4. A colorimeter according to claim 1 wherein said dividing means includes a first substantially horizontal conduit having said inlet and one of said outlets, and a second substantially horizontal conduit disposed below said first conduit and having an inlet extending into an aperture formed into the lower portion of said first conduit between said inlet and outlet thereof.

5. A method of colorimetrically analyzing a flowing stream of liquid segments of uniform first volume spaced apart by gas segments of uniform second volume, said method comprising:

dividing said flowing stream into two quotient streams containing substantially only liquid and substantially only gas, respectively, by passing said stream into the inlet of a first, substantially horizontal conduit having an outlet and an aperture formed in the lower portion of said first conduit intermediate said inlet and said outlet thereof, to which aperture is therebelow connected the inlet of a second, substantially horizontal conduit having an outlet, said second conduit defining the sight passageway of a flow cell structure, and cyclically and alternately closing said outlet of said first conduit and said outlet of said second conduit, sad first conduit outlet being open for a time interval having a ratio to the time interval said second conduit is open which is equal to or slightly greater than the ratio of said second volume to said first volume, whereby gas segments pass over said aperture and said liquid segments fall through said aperture and pass along said second conduit, and colorimetrically analyzing said liquid segments passing along said second conduit, and whereby only one of the two available flow paths through said conduits open at any one time.

6. An analytical system comprising a colorimeter having a flow cell including a first, substantially horizontal conduit having an inlet, and outlet and an aperture in the bottom portion thereof intermediate said inlet and said outlet, and a second, substantially horizontal conduit including a sight passageway and having an inlet and an outlet, said second conduit inlet being disposed below said aperture and extending upwardly to merge with said aperture, pump means for transmitting a flowing stream of liquid segments of uniform first volume spaced apart by gas segments of uniform second volume into said inlet of said first conduit, and valve means coupled to said outlet of said first conduit and to said outlet of said second conduit for cyclically and alternately closing said conduits, the operation of said valve means being synchronized with the transmission of said gas segments by said pump means, whereby said gas segments passed over said aperture in said first horizontal conduit and avoid passing through said sight passageway, and only one of the two available flow paths through the flow cell is open at any one time.

7. Apparatus according to claim 6 further including cam means for actuating said valve means to open and close said conduits, said cam means being coupled to said pump means and synchronized with the gas segment transmission thereof.

References Cited

UNITED STATES PATENTS

| 2,494,884 | 1/1950 | Lassman et al. | 103—2 |
| 2,797,149 | 6/1957 | Skeggs | 23—230 |
| 3,222,135 | 12/1965 | Ashmead | 23—253 |
| 3,225,601 | 12/1965 | Shrewsbury | 356—246X |
| 3,241,432 | 3/1966 | Skeggs et al. | 250—218X |
| 3,373,872 | 3/1968 | Hrdina | 210—198C |
| 3,399,972 | 9/1968 | Skeggs et al. | 23—253X |
| 3,408,166 | 10/1968 | Natelson | 23—253 |

FOREIGN PATENTS

| 919,759 | 2/1963 | Great Britain | 356—246 |

RONALD L. WIBERT, Primary Examiner

R. J. WEBSTER, Assistant Examiner

U.S. Cl. X.R.

23—253, 292; 103—2; 137—608, 625.4; 250—218; 356—244